(12) United States Patent
Procopio

(10) Patent No.: US 6,366,740 B1
(45) Date of Patent: Apr. 2, 2002

(54) APPARATUS AND METHOD FOR ADAPTING A 35MM SLR STILL CAMERA TO A 35MM MOTION PICTURE VIEWFINDER

(76) Inventor: Fortunato Procopio, 217 W. 18th St., New York, NY (US) 10011

(*) Notice: Subject to any disclaimer, the term of this patent is extended or adjusted under 35 U.S.C. 154(b) by 0 days.

(21) Appl. No.: 09/499,489

(22) Filed: Feb. 7, 2000

Related U.S. Application Data

(60) Provisional application No. 60/119,127, filed on Feb. 8, 1999.

(51) Int. Cl.$^7$ .................. G03B 17/24; G03B 19/12; G03B 13/12
(52) U.S. Cl. .................. 396/316; 396/150; 396/296; 396/355
(58) Field of Search .................. 396/287, 296, 396/315, 316, 354, 355, 373, 435, 436, 150, 151; 352/170, 171

(56) References Cited

U.S. PATENT DOCUMENTS

| | | | | |
|---|---|---|---|---|
| 3,710,699 A | * | 1/1973 | Mitani | 396/355 |
| 4,338,010 A | * | 7/1982 | Takahashi | 396/355 |
| 4,401,374 A | * | 8/1983 | Kimura et al. | 396/355 |
| 4,693,577 A | * | 9/1987 | Sasagaki et al. | 396/355 |
| 4,833,494 A | * | 5/1989 | Ohsawa | 396/355 |
| 5,353,080 A | * | 10/1994 | Christman | 396/355 |
| 5,457,511 A | * | 10/1995 | Kanai et al. | 396/355 |
| 5,649,259 A | * | 7/1997 | Hylen | 396/316 |
| 6,097,900 A | * | 8/2000 | Haraguchi | 396/355 |

* cited by examiner

*Primary Examiner*—Alan A. Mathews

(57) ABSTRACT

The invention enables users to adapt 35 mm SLR still cameras to function as 35 mm motion picture viewfinders and adapt 35 mm SLR still cameras to create photographs which correspond to what they see through its viewing system. By substituting an accurately marked focusing screen for the original and placing an identically marked insert within the camera we can accomplish both of these goals. The insert interrupts the image forming light path close enough to the film plane to precisely transfer its markings to the image exposed there. As the images are all formed in the same size as in 35 mm motion picture photography the optical characteristics they present are identical to those of 35 mm motion picture photography.

13 Claims, 7 Drawing Sheets

APPARATUS AND METHOD FOR ADAPTING A 35MM SLR STILL CAMERA TO A 35MM MOTION PICTURE VIEWFINDER

CROSS REFERENCES TO RELATED APPLICATION

This application is based on provisional filing Ser. No. 60/119,127 filed Feb. 8, 1999.

BACKGROUND OF THE INVENTION

This invention relates generally to the field of 35 mm motion picture photography, and more particularly to a method and apparatus for adapting a 35 mm single lens reflex (SLR) still camera to function as a 35 mm motion picture viewfinder able to record images, which include 35 mm motion picture format markings.

In the process of motion picture production and especially during pre-production, it has always been useful to anticipate both the creative impact and the practical requirements of proposed scenes. As scenes are built from individual shots and shots are the result of camera placement and lens choice it has been found to be even more useful and revealing to preview individual shots as they will be captured by the motion picture camera. The tool used for preview of this sort is called a viewfinder, sometimes referred to as a director's viewfinder. The most accurate and realistic viewfinder would be the actual viewing system of the intended motion picture camera itself. An image formed with this equipment would present to the viewer all of the qualities and characteristics of the image eventually recorded on film. However, these cameras are cumbersome and extremely expensive as are the lenses used with them. For this purpose, substitutes for the motion picture camera have been developed.

A shot is the image formed by a chosen lens placed in a particular location focused on a chosen subject and set at a determined aperture. The basic optical characteristics of an individual shot are field of view, perspective, and depth of field. The most useful viewfinder will represent all of these characteristics. To this end, one form of viewfinder eliminates the motion picture camera and substitutes a simple viewer on which motion picture lenses can be mounted. This is an excellent substitute reducing some of the bulk of equipment, but it requires the use of motion picture lenses and therefore has similar limitations including size, weight, and expense. Smaller, lighter viewfinders have been created, which, through telescoping optics and a physical masking mechanism, define the area which would be included in individual motion picture formats. Although these viewfinders approximate the angle of view of a particular focal length lens given a particular format, they do not represent any other optical qualities of that lens.

Video systems, which electronically mask or mark the aspect ratios of motion picture formats on images they gather have been created, but their optical systems form images on their recording medium of a different size than motion picture photography. Therefore, there is no correspondence between lenses used with this type of viewfinder and lenses used later during motion picture production. The optical characteristics of the lenses in this view-finding system are not representative of those used in motion picture photography. Finally, a viewfinder can be made from two reticles, which define a field of view when properly aligned. This viewfinder is very light weight and inexpensive, but it can reveal no more than field of view.

Previous viewfinders suffer in varying degrees from one or more of the following limitations: expense, inconvenience, or inaccuracy. To present an accurate and realistic representation of the image, the viewfinder must form the image in its actual size. If the size of the image formed in the viewfinder is the same as it will be when formed in the motion picture camera then all other optical characteristics will be comparable. A lens of a particular focal length will present the same angle of view when fitted to the viewfinder or to a motion picture camera, and the qualities of perspective and depth of field will also be identical.

Furthermore, none of the viewfinders mentioned above are capable of creating photographs, which are an accurate record of what is seen through them. Some systems have been equipped with video or digital still recording devices. In one system, a video record of the image formed on a focusing screen within the viewfinder is made by a secondary optical system. These indirect means limit the accuracy of the system particularly as it relates to depth of field and perspective. In another system, the video image is recorded directly, but the image size is not the same as a motion picture camera's and therefore the optical qualities of the image are different (because the focal length of the lens is different) although the angle of view may be the same.

In the past, camera manufacturers have offered replacement focusing screens with markings, which corresponded to the 1:1.33 television aspect ratio. These markings were a useful aid when composing a still photograph to be presented in the television format. In designing these markings, no consideration was given to the actual dimensions of television or motion picture photographic image areas. Therefore, the markings did not imply a direct reference regarding equivalent focal length in television or motion picture photography.

SUMMARY OF THE INVENTION

A primary advantage of the invention is to provide a method and apparatus for adapting a 35 mm SLR still camera to function as a 35 mm motion picture viewfinder.

Another object of the invention is to provide a method and apparatus for adapting a 35 mm SLR still camera to record motion picture format markings on photographs exposed in the camera.

Another object of the invention is when fitted with a lens of a specific focal length a 35 mm SLR still camera reveals the area photographed by a 35 mm motion picture camera fitted with a lens of the focal length.

Another object of the invention is when fitted with a lens of a specific focal length a 35 mm SLR still camera may record motion picture format markings on photographs exposed in said camera revealing the area photographed by a 35 mm motion picture camera fitted with a lens of the focal length.

A further object of the invention is to provide a more accurate and realistic motion picture viewfinder, which through the use of interchangeable or zoom lenses reveals all optical characteristics of a lens of a given focal length and aperture including depth of field, perspective and angle of view.

In accordance with a preferred embodiment of the present invention, an apparatus for adapting a 35 mm SLR still camera to function as a 35 mm motion picture viewfinder comprises a replacement focusing screen for a 35 mm SLR still camera accurately scribed with 35 mm motion picture format markings and an insert placed in front of film accurately scribed with 35 mm motion picture format markings.

In accordance with another embodiment of the invention, a method for precisely coordinating markings seen on the focusing screen of a 35 mm SLR still camera through its viewfinder with markings transferred to photographs exposed in said camera comprises the steps of marking a replacement focusing screen and an insert installed against the film aperture plate between film guide rails with accurate markings of 35 mm motion picture formats.

Other objects and advantages of the present invention will become apparent from the following descriptions, taken in connection with the accompanying drawings, wherein, by way of illustration and example, an embodiment of the present invention is disclosed.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
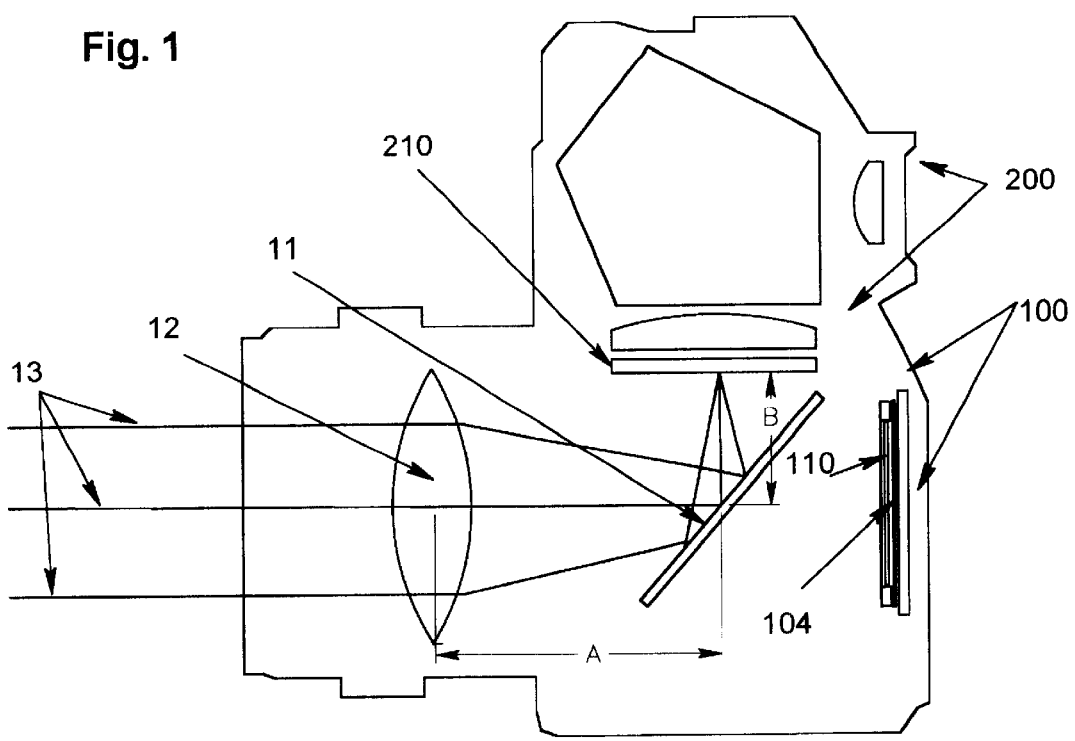
FIG. 1 is a cross sectional view of a 35 mm SLR still camera reflex viewing system with its mirror in viewing position and an apparatus in accordance with a preferred embodiment of the present invention installed.
Figure 2:
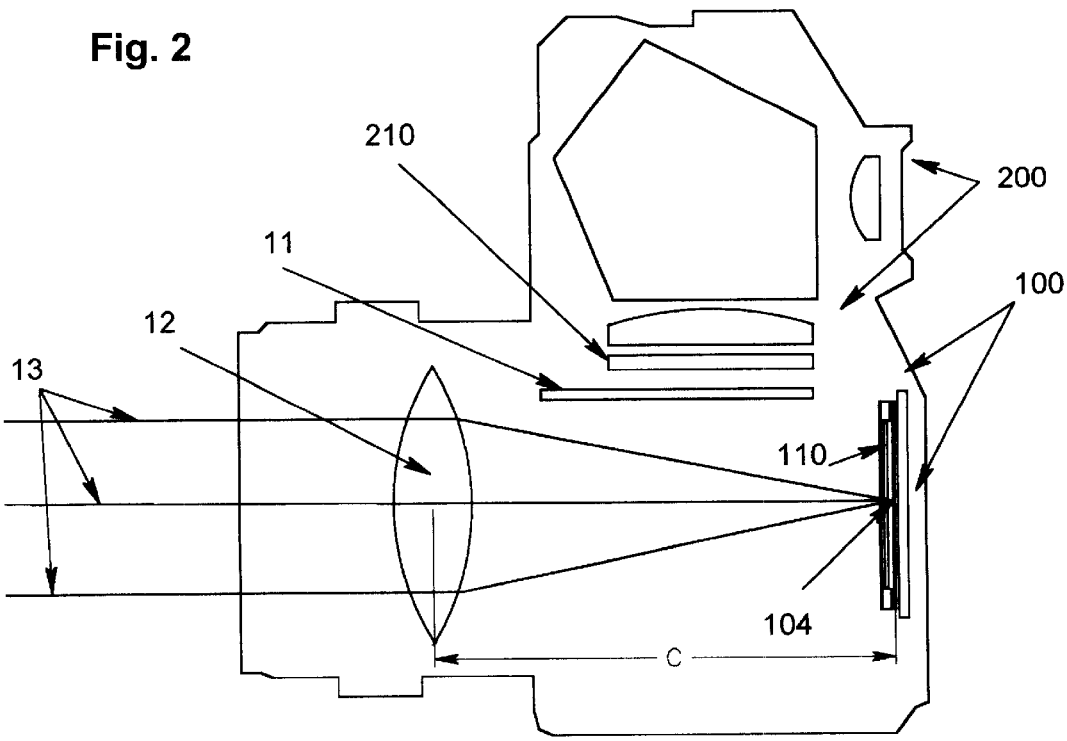
FIG. 2 is a cross sectional view of a 35 mm SLR still camera of FIG. 1 with its mirror in exposure position.

Turning first to FIGS. 1 and 2 there are shown two states of the reflex system in a 35 mm SLR camera. FIG. 1 depicts the camera with its mirror 11 in viewing position. Light from the subject 13 is focused through lens 12 and after reflecting off mirror 11 on to focusing screen 210. With the camera in this state the image formed on focusing screen 210 may be viewed through viewing system 200. FIG. 2 depicts the camera with its mirror 11 in the exposure position wherein the light from subject 13 passes through lens 12 to form an image on film 104 held in registration with the film gate assembly 100. It is when the camera is in this state that the shutter (not shown) is opened allowing the light from subject 13 to strike film 104

35 mm SLR cameras are designed so that the distance C from the lens 12 to the film 104 is exactly the same as the distance A+B from the lens 12 to the focusing screen 210, when the later is measured in a path from the lens 12 to the mirror 11 to the focusing screen 210. Because the distance from a lens to the surface on which the image is to be formed determines focus, it is the design described above that assures that a particular subject, which appears in focus on focusing screen 210, will also be in focus on the film 104. Furthermore, although the orientation of the images formed in these two modes differs, the size of the images formed on the focusing screen 210 and the film 104 is the same. In fact, one skilled in the art of photography will appreciate that the image formed by a lens of a particular focal length when in focus and at the same distance from the same subject will under any circumstances be the same size. The reflex system in a 35 mm SLR is capable of forming the same size image in two places: on the focusing screen 210 and on the film 104.

Through accurate physical and optical alignment, 35 mm SLR cameras enable a user to preview the image which will be exposed on the film and all of its optical characteristics such as field of view, perspective, and depth of field. In the preferred embodiment of the invention, markings of identically size are superimposed on the images as they are formed at the focusing screen and on the film. One is thereby able to see through the viewing system of the 35 mm SLR camera an image with markings superimposed on it, which is identical to the image exposed on the film including the size and position of said markings.

Following the preferred procedure, the 35 mm SLR camera is modified in two ways. First, in accordance with one aspect of the invention, the focusing screen 210 shown in FIGS. 1 and 2 is exchanged. In its place is substituted a focusing screen that has been precisely marked on its surface on which the image is formed. These marks appear superimposed on the image as seen through the camera's viewing system 200. It is to be noted that in many 35 mm SLR cameras, focusing screens may be removed and reinstalled or exchanged by the user in the field with out the benefit of special knowledge, tools or techniques. The method of removing, re-installing and exchanging the focusing screen is determined by the manufacturer and commonly set out in the user's manual distributed with each camera.

Figures 3, 4:
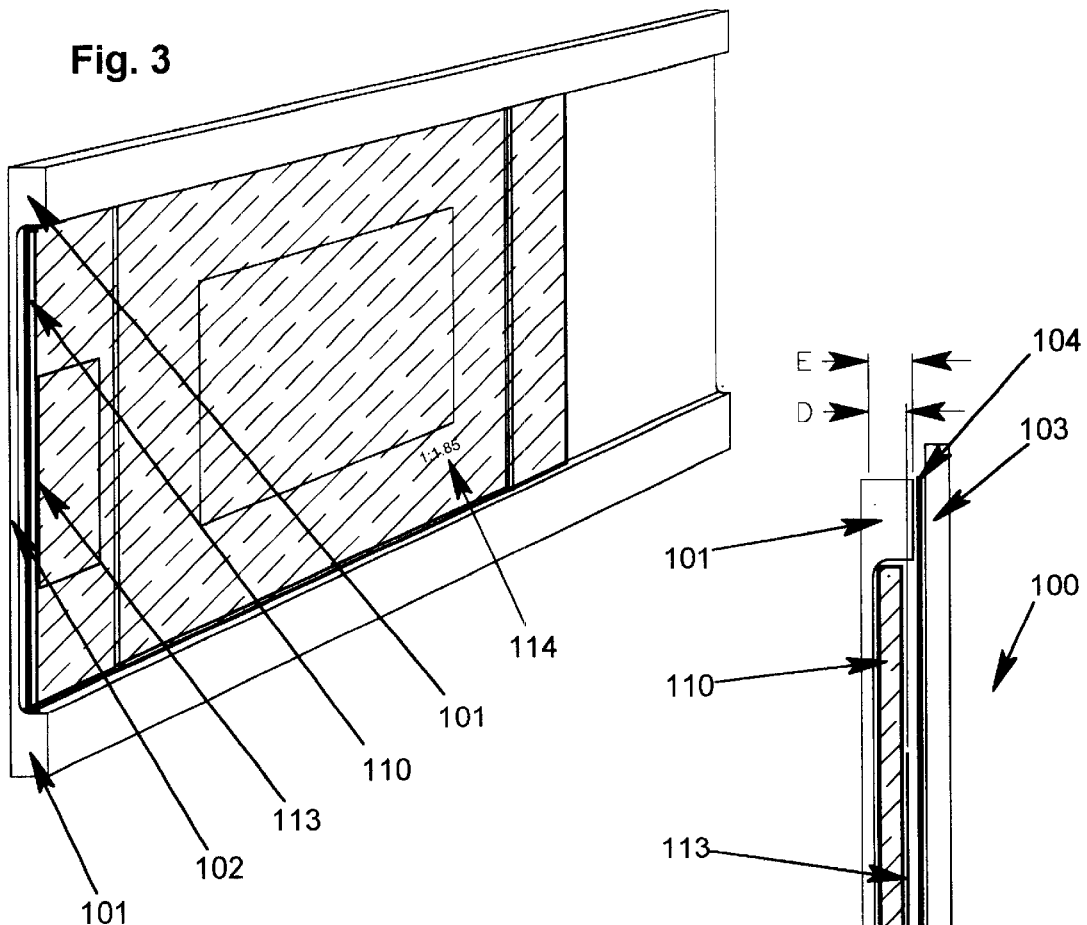
FIG. 3 is a perspective view of the apparatus of the present invention installed in the aperture plate of a 35 mm SLR still camera.
FIG. 4 is a cross sectional view of FIG. 3.

Second, in accordance with another aspect of the invention, an insert 110 is installed within the film gate assembly 100. Insert 110 is marked exactly as the focusing screen. FIGS. 3 and 4 show insert 110 positioned against film aperture plate 102 between film guide rails 101 just ahead of film 104 on the side closest to lens 12. In this position, insert 110 interrupts the image forming light path causing its markings to be transferred to the film.

Figure 5:
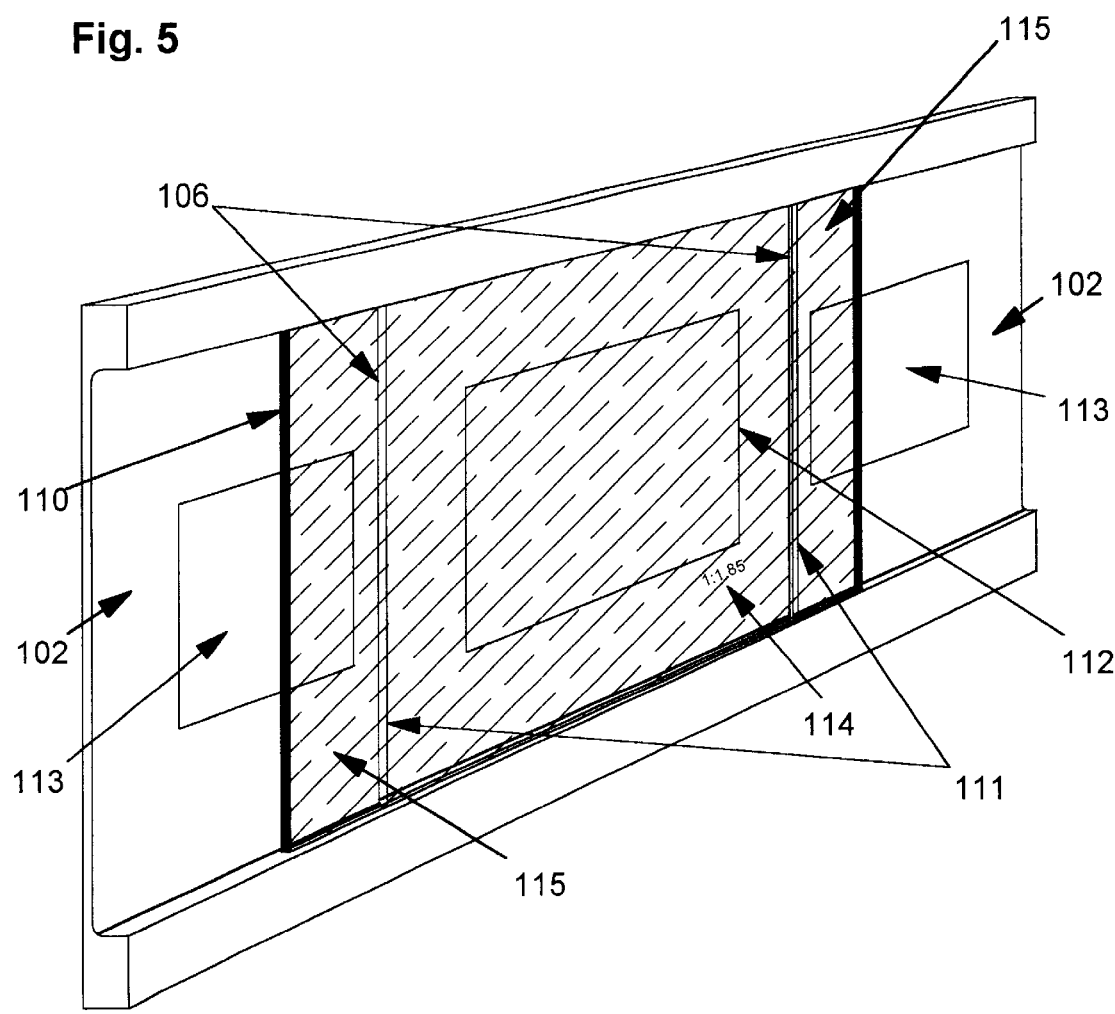
FIG. 5 is a perspective view of the apparatus of the present invention aligned over the aperture of a 35 mm SLR still camera.
Figure 6:
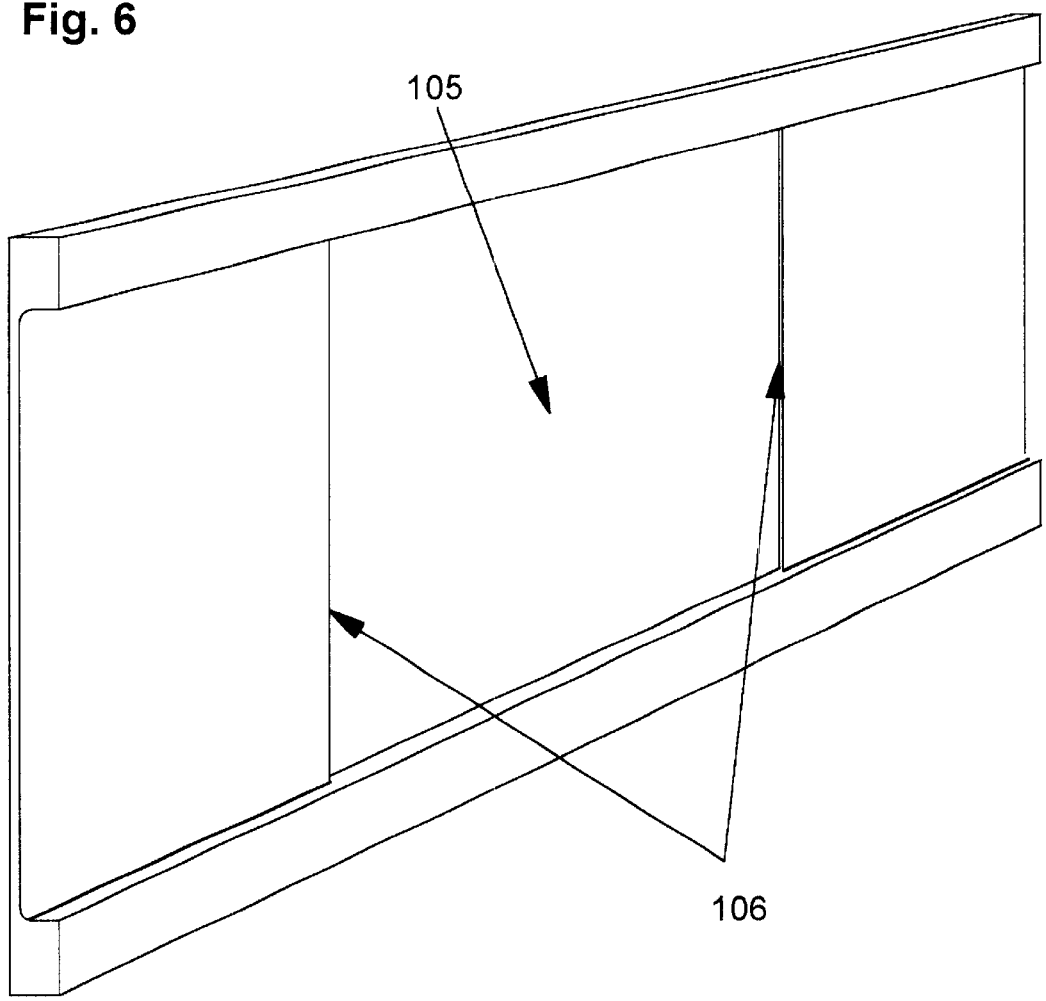
FIG. 6 is a perspective view of the aperture plate of a 35 mm SLR still camera without the insert.

Turning to FIGS. 5 and 6, there are shown horizontal ends 115 of insert 110 extending beyond edges 106 of aperture 105. Horizontal ends 115 allow insert 110 to be suspended over aperture 105. Furthermore, horizontal ends 115 provide area which, may be used to secure insert 110 to aperture plate 102. In the preferred embodiment of the invention as shown in FIG. 5 insert 110 is secured to aperture plate 102 by means of thin adhesive tape 113. It is to be noted that the installation and removal of insert 110 is of intuitive simplicity and may be accomplished by the user in the field without the benefit of special knowledge, tools or techniques.

In the illustrated embodiment of the invention shown in FIGS. 3 and 4, insert 110 is a thin optically clear slide and is installed so that the markings on it are positioned closest to the film. This insert 110 may be a thin sheet of optically clear material such as glass or plastic which is marked so as to interrupt the image forming light path and superimpose its markings upon the image. It might also be a cut out, stencil like, sheet of opaque or translucent material that causes the image to be marked as required. Or, it may take the form of a reticle the lines of which are suspended over the aperture. In any case, the insert 110 is placed in the optical path so that its effect is to cause precise markings to be transferred to the recording medium. Furthermore, the combined thickness D of insert 110 and any affixing medium is constrained to less than the depth E of the trough created by film guide rails 101 and aperture plate 102. However, within this constraint the markings on insert 110 are positioned very close to film 104. The proximity of insert 110 to film 104 insures that its markings will be transferred accurately and with sufficient clarity to the image created on film 104.

In carrying out the present invention, the precise coordination of the markings seen on the focusing screen and the markings exposed on the film is insured by the following:

precise alignment of the 35 mm SLR camera's reflex system including the focusing screen;

precision of the markings on the focusing screen and alignment of the markings;

precision of the markings on the insert and the alignment of the markings; and alignment of the insert over the aperture.

In the present form of the invention, each of these issues is addressed. It is found in practice that a properly maintained 35 mm SLR camera has a precisely aligned reflex system. The focusing screen and insert can be marked with sufficient precision to insure this coordination and the insert can be precisely aligned over the aperture. As shown in FIG. 4, the alignment of insert 110 can be accomplished in the present instance where insert 110 is of dimensions allowing installation against film aperture plate 102 between film guide rails 101 with sufficiently low vertical tolerance F to assure accurate vertical alignment. Additional markings may be applied to insert 110 as shown in FIG. 5. Additional markings in the form of vertical lines are spaced so that their inside edges 111 can be aligned over edges 106 of the aperture as shown in FIGS. 5 and 6 thereby aligning insert 110 and all other markings on it.

Figure 7:
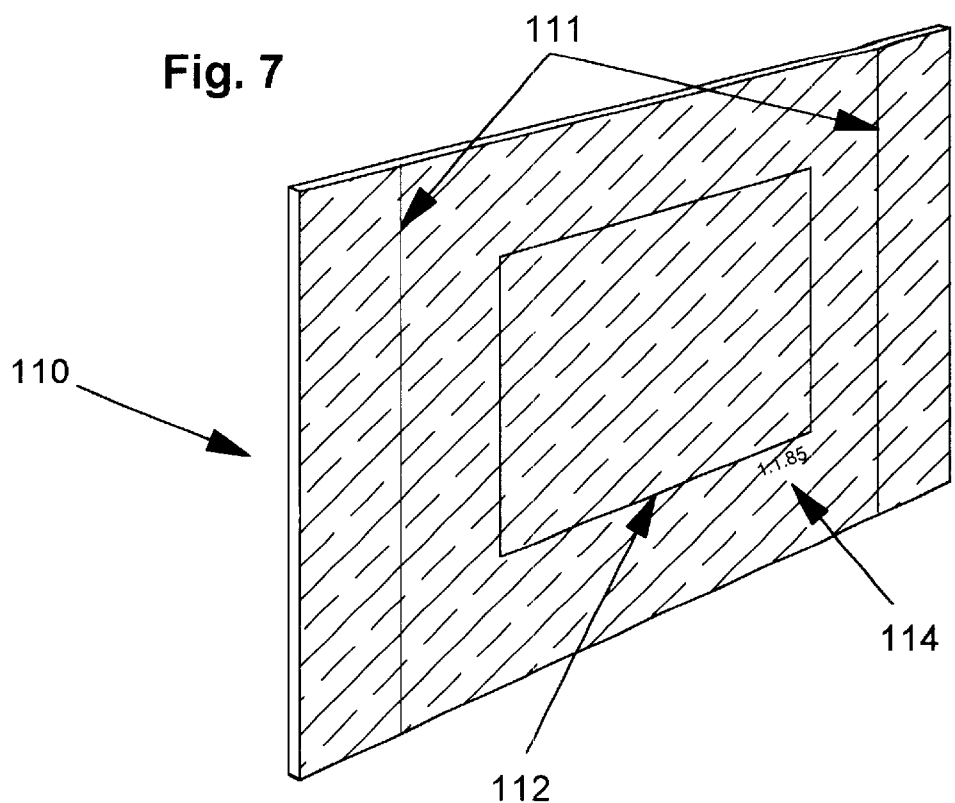
FIG. 7 is a perspective view of the in accordance with an embodiment of the present invention.
Figure 8:
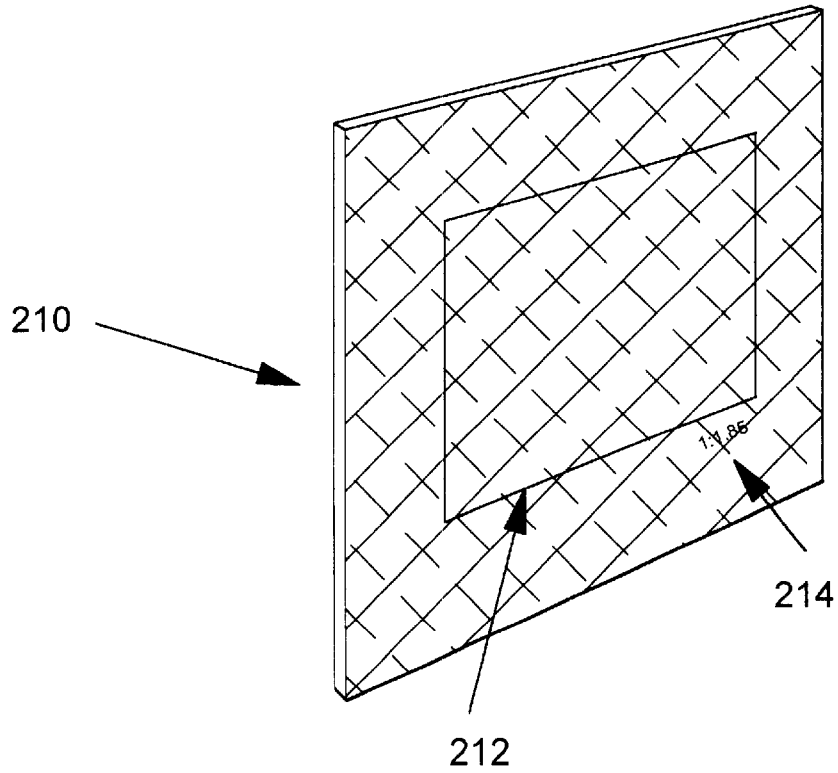
FIG. 8 is a perspective view of a replacement focusing screen of a 35 mm SLR still camera.
Figure 9:
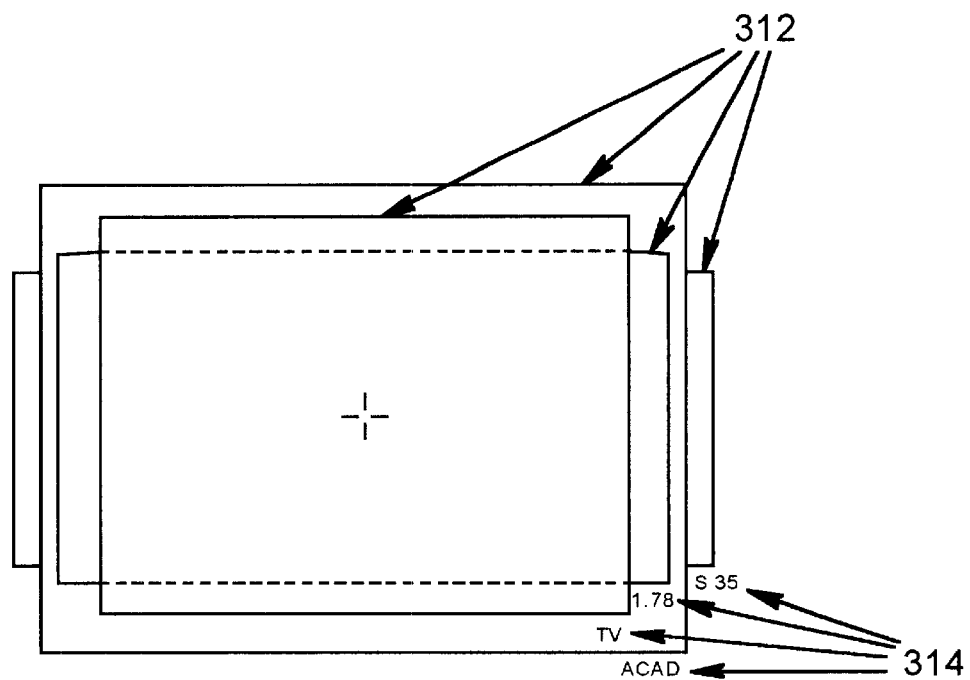
FIG. 9 is a view of an example of multiple 35 mm motion picture formats as they appear on the replacement focusing screen and the apparatus of the present invention.

In keeping with one of the principle objects of the invention, FIGS. 7 and 8 show markings 212 on the focusing screen 210 and markings 112 on insert 110, which have significance particular to 35 mm motion picture photography. These markings 212 and 112 delineate the area of the image formed on the focusing screen 210 and the film 104, which would be included in the image area of 35 mm motion picture photography for theatrical release in the 1:1.85 aspect ratio. The design of said markings is consistent with the common practices of motion picture ground glass marking. These markings 212 and 112 may include labels 114 (also shown in FIG. 5) and 214 identifying the format represented by the markings. In this embodiment of the invention, the method of applying standard motion picture ground glass markings to the 35 mm SLR focusing screen and the corresponding insert serves two purposes. The first purpose is to delineate the area of the image formed in the 35 mm SLR camera, which would be included in the image area of 35 mm motion picture photography. The second purpose is to make those familiar with motion picture photography comfortable with these markings and their significance. FIG. 9 is a view of an example of multiple 35 mm motion picture format markings 312 and their labels 314 as they might appear on the replacement focusing screen and the apparatus of the present invention.

As the scale of 35 mm motion picture photography and 35 mm still photography is similar, the invention is particularly suited to this embodiment. Film for 35 mm motion picture photography and film for 35 mm still photography is nearly identical in its physical dimensions. The image area on the negative, however, is not. The film is oriented horizontally in 35 mm still cameras and vertically in motion picture cameras. Yet, both image areas are wider than they are high. Therefore, the 35 mm still negative image area is larger, its width unbound by the limit of the film's width. Since the motion picture image can be entirely contained within the still image one can represent within the still image exactly the area of a motion picture image in its various formats.

By scribing the focusing screen of a 35 mm SLR still camera with the markings of the various 35 mm motion picture formats, the still camera is converted into an accurate motion picture viewfinder. Formats may be represented individually, as the 1:1.85 format 212 and its label 214 are shown in FIG. 8. Or, formats may be represented in combination. In FIG. 9, the formats 312, TV, 1:1.78 (HDTV), S 35 (Super 35-1:2.40), and the Academy Aperture are shown in combination. Labels 314 identifiy each format. Shown together, their relative sizes can easily be compared.

Quite importantly, each lens mounted on the 35 mm SLR still camera will function as it would if used on a motion picture camera. For example, a 28 mm lens will show exactly the same angle of view as a 28 mm lens fitted on a 35 mm motion picture camera. And, as important, it will reveal the optical characteristics of that lens, in this case, wide angle perspective. It will also accurately represent depth of field according to the f-stop set on the lens. Any lens, including zoom lenses, can be used. No physical or mathematical conversion is required to anticipate the performance of the lens or one of the same focal length and aperture mounted on a motion picture camera.

It is of consequence to note that care must be taken to orient the marking on the focusing screen and the insert so that they will appear appropriately when superimposed on the images. For example: the markings appear upside down and backwards when the insert is properly installed. The markings must also be applied to the appropriate surface of each element.

Figure 10:
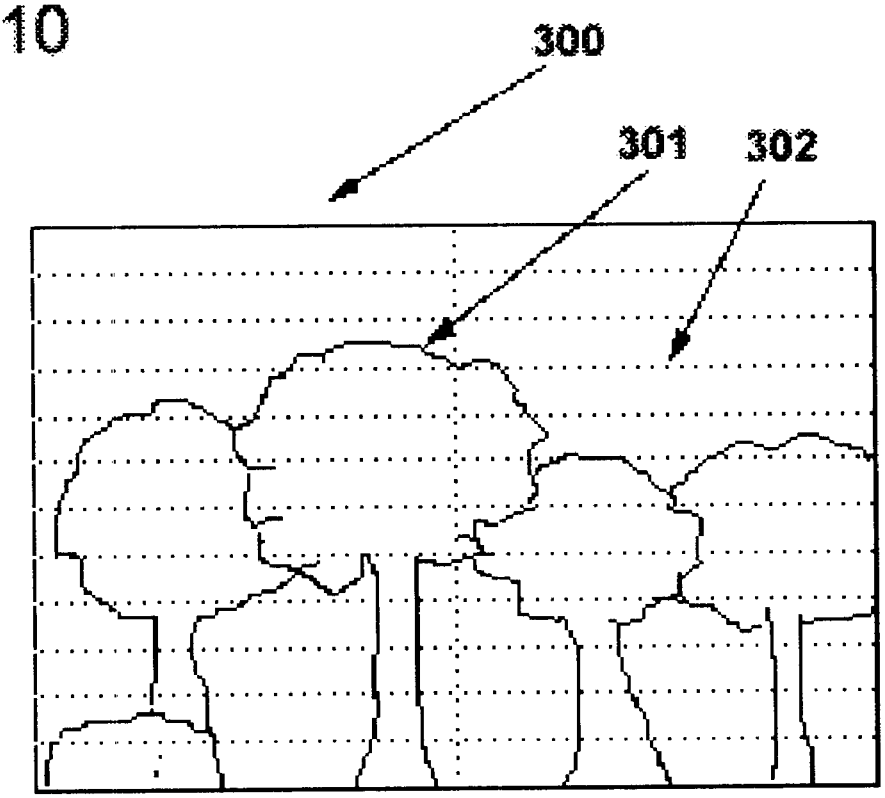
FIG. 10 is an alternate application of the present invention.

One can appreciate that the invention may be employed as an aid in fields other than motion picture photography. The invention may be employed in any circumstance in which, it is useful to include reference markings in the viewing system of a 35 mm SLR camera, especially in instances where a photographic record of what is seen through the viewing system is of value. For example, turning to FIG. 10, which depicts an image formed on a focusing screen 300, suitable markings 302 might be included, which are an aid in the field of forestry where it is useful to view and record reference markings, which help to establish the relative size of trees 301. Using such a system one could more accurately track tree growth and maintain records of this growth in the form of photographs created using the invention. It is contemplated that the fields of cartography, astronomy and engineering would also be served by the invention.

The invention may be applied to cameras and optical devices other than 35 mm SLR still cameras. The invention permits the coordination of precise markings included in the preview system of an optical recording device with markings imprinted upon the record made by that device. In another example relating to the field of motion picture photography, a 6 cm×7 cm SLR still camera could be adapted to function as a viewfinder for 65 mm motion picture photography. The area of 65 mm motion picture photography can be contained within the 6 cm by 7 cm image area. In keeping with the invention, other still camera formats are suitable for other fields and furthermore, other optical devices may be adapted to benefit other fields.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. An apparatus for adapting a 35 mm SLR still camera to function as a 35 mm motion picture viewfinder comprising:
    a replacement focusing screen for the 35 mm SLR still camera accurately scribed with 35 mm motion picture format markings; and
    an insert placed in front of film in the 35 mm SLR still camera; said insert accurately scribed with 35 mm motion picture format markings.

2. The invention of claim 1 wherein said focusing screen can be reversibly installed in the 35 mm SLR still camera.

3. The invention of claim 1 wherein said focusing screen is marked with multiple motion picture formats.

4. The invention of claim 1 wherein said focusing screen is marked by means of an overlay applied to its surface.

5. An apparatus for adapting a 35 mm SLR still camera to record 35 mm motion picture format markings on photographs exposed in said camera comprising:
    a thin insert marked with 35 mm motion picture formats for insertion close to the film plane of the 35 mm SLR still camera,
    said insert is of dimensions allowing installation against a film aperture plate of the 35 mm SLR still camera between a pair of film guide rails of the 35 mm SLR still camera, said aperture plate and guide rails form a trough,
    the combined thickness of said insert and any affixing medium is less than the depth of the trough created by the film guide rails and the aperture plate.

6. The invention of claim 5 wherein said insert is of dimensions allowing installation against the film aperture plate between the film guide rails with sufficiently low vertical tolerance to assure accurate vertical alignment.

7. The invention of claim 5 further comprising means of horizontally aligning said insert.

8. The invention of claim 5 wherein said insert is marked with multiple motion picture formats.

9. The invention of claim 5 wherein said insert is comprised of an optically transparent, thin, slide, which has markings representing 35 mm motion picture formats.

10. The invention of claim 5 wherein said insert is comprised of a thin mask cut away to reveal the markings of motion picture formats.

11. The invention of claim 5 wherein said insert is secured to the aperture plate with thin tape.

12. A method for precisely coordinating markings seen on the focusing screen of a 35 mm SLR still camera through its viewfinder with markings transferred to photographs exposed in said camera comprising the steps of:
    marking a replacement focusing screen for the 35 mm SLR still with accurate markings of 35 mm motion picture formats;
    marking an insert installed against the film aperture plate between film guide rails of the 35 mm SLR still camera with the accurate markings of 35 mm motion picture formats.

13. The invention of claim 12 wherein said markings may represent multiple motion picture formats.

* * * * *